United States Patent

Gross et al.

[11] Patent Number: 5,732,732
[45] Date of Patent: Mar. 31, 1998

[54] TAPPING FITTING

[75] Inventors: Yair Gross, Doar Na Menashe; Eitan Kalinoff, Doar Na Hof Carmel, both of Israel

[73] Assignee: Plasson Maagan Michael Industries Ltd, Doar Na Menashe, Israel

[21] Appl. No.: 662,749

[22] Filed: Jun. 10, 1996

[30] Foreign Application Priority Data

Jul. 9, 1995 [IL] Israel .................... 114505

[51] Int. Cl.⁶ .................... F16K 43/00; F16L 41/06
[52] U.S. Cl. .................... 137/318; 30/93; 219/535; 219/544; 285/133.11; 285/133.4; 285/197; 408/101
[58] Field of Search .................... 83/54; 137/15, 137/318; 30/92, 93, 94, 95, 96, 103; 219/535, 544, 547, 548; 285/21, 156, 197, 198, 199; 408/67, 72 R, 83.5, 87, 95, 101, 204, 102

[56] References Cited

U.S. PATENT DOCUMENTS

| | | | |
|---|---|---|---|
| 2,790,652 | 4/1957 | Risley et al. | 285/197 |
| 2,839,075 | 6/1958 | Mueller | 137/318 |
| 3,307,435 | 3/1967 | Floren | 137/318 |
| 3,756,261 | 9/1973 | Minchhoff | 137/318 |
| 4,029,118 | 6/1977 | Merideth | 137/318 |
| 4,063,844 | 12/1977 | Pessia | 137/318 |
| 4,391,458 | 7/1983 | Blakeley | 285/197 |
| 4,541,447 | 9/1985 | Soumar et al. | 137/318 |
| 4,655,480 | 4/1987 | Thalmann | 137/318 |
| 4,730,636 | 3/1988 | Volgstadt et al. | 137/318 |
| 5,345,964 | 9/1994 | Friedel | 137/318 |
| 5,348,045 | 9/1994 | Servé | 137/318 |
| 5,425,395 | 6/1995 | Brennan | 137/318 |

FOREIGN PATENT DOCUMENTS 0361344  9/1989  European Pat. Off. .

*Primary Examiner*—George L. Walton
*Attorney, Agent, or Firm*—Benjamin J. Barish

[57] ABSTRACT

A tapping fitting for application to a pipe in order to tap a fluid conducted therethrough to an ancillary device includes a housing having a rotatable blade assembly threadedly received within the housing main section and including a cylindrical cutting blade at its inner end such that rotation of the blade assembly cuts a cylindrical slug from the pipe when attached thereto. The device further includes a hollow stem having an inner end secured to the rotatable blade assembly and an outer end for receiving a key to rotate the hollow stem and the blade assembly from an initial retracted position to a projected position and then to a final retracted position. A seal between the outer surface of the hollow stem and the housing main section seals the interior of the pipe from the external side of the housing both during and after the cutting of the cylindrical slug from the pipe.

20 Claims, 3 Drawing Sheets

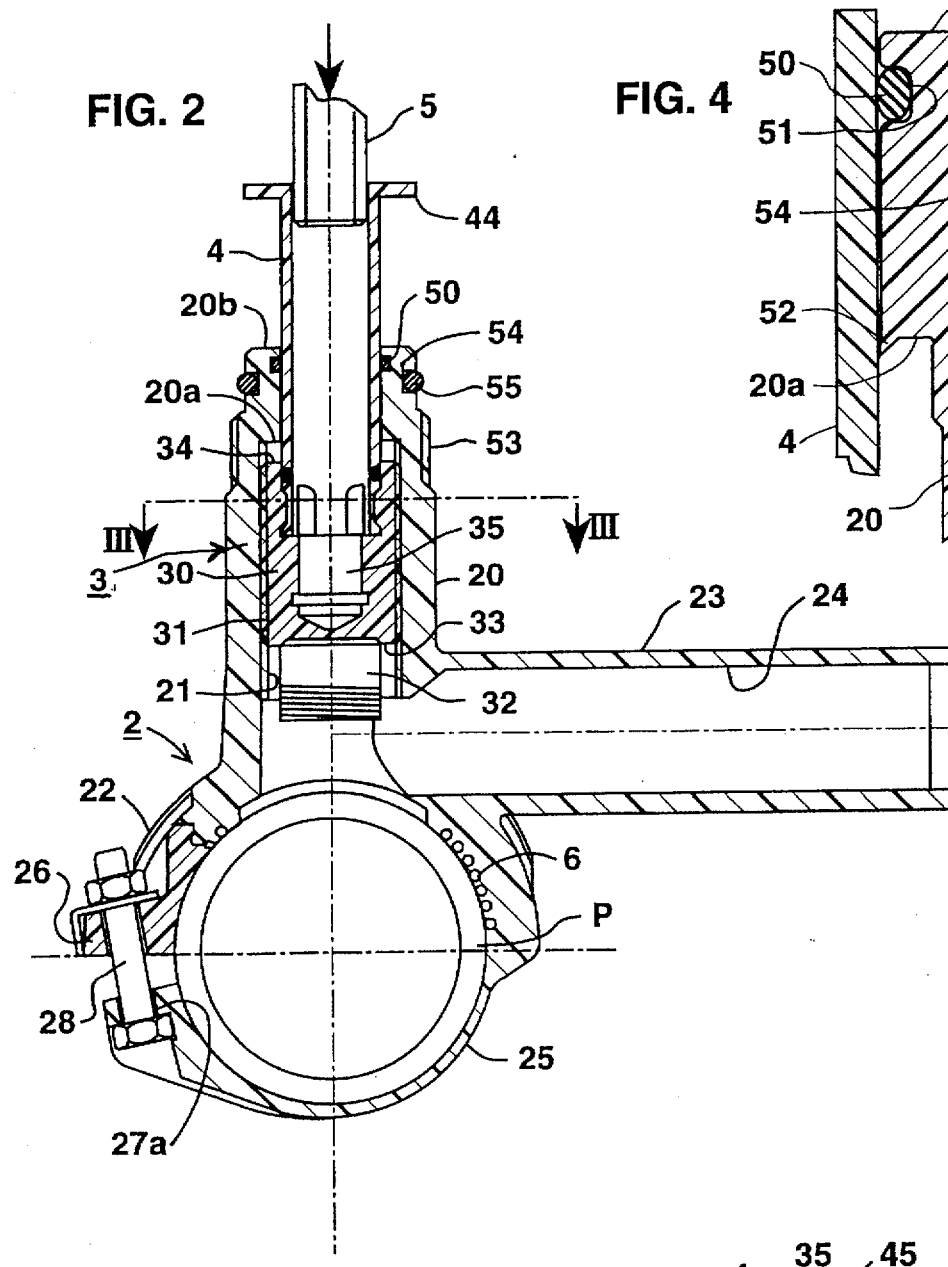

TAPPING FITTING

FIELD AND BACKGROUND OF THE INVENTION

The present invention relates to a tapping fitting for application to a pipe in order to direct fluid conducted therethrough to an ancillary device, such as a branch conduit or an outlet tap. The invention is particularly useful in electrofusion fittings for plastic pipes wherein the fitting is bonded to a plastic pipe by electrofusion. The invention is therefore described below with respect to this application but it will be appreciated that the invention could also be used in other applications.

Tapping fittings are known for application to a pipe in order to tap a fluid conducted therethrough to an ancillary device. One known type fitting comprises a housing including a main section, an attaching section in axial alignment with the housing main section for attaching the fitting to a pipe, and an outlet section for directing the fluid from the pipe to the ancillary device; and a rotatable blade assembly formed at its outer end with external threads threadedly received within the housing main section and including a cylindrical cutting blade at its inner end such that a key may be used to rotate the blade assembly and to move it axially from an initial retracted position within the housing main section, to a projected position through the attaching section to cut a cylindrical slug from the pipe when attached thereto, and then to a final retracted position within the housing main section to thereby effect a connection between the pipe and the ancillary device. An example of such a tapping fitting is described in U.S. Pat. No. 4,063,844.

Such tapping fittings have come into extensive use for tapping branch conduits to high-pressure liquid or gas supply pipes of a plastic material. However, one of the problems in the use of such tapping fittings is leakage of the liquid or gas while the cylindrical slug is being cut from the pipe, or while the rotatable blade assembly is being moved with the slug to the final retracted position of the blade assembly within the housing.

OBJECTS AND BRIEF SUMMARY OF THE INVENTION

An object of the present invention is to provide a tapping fitting of the foregoing type having advantages in the above respects.

According to the present invention, there is provided a tapping fitting of the foregoing type, which fitting further comprises a stem having an inner end secured to the rotatable blade assembly, and an outer end for receiving the key to rotate the stem and the blade assembly from the initial retracted position of the blade assembly to its projected position, and then to its final retracted position; and a seal between the outer surface of the stem and the housing main section effective to seal the interior of the pipe from the external side of the housing both during and after the cutting of the cylindrical slug from the pipe.

As will be described more particularly below, such a tapping fitting produces an effective seal between the pipe and the outer side of the housing both during the cutting of the cylindrical slug by the rotatable blade assembly, and also during the moving of the slug and the rotatable blade assembly to the latter's final retracted position within the housing to establish communication between the pipe and the ancillary device connected to the outlet section of the housing.

According to further features in the described preferred embodiment, the stem is a separate unit attached to the rotatable blade assembly and is removable therefrom after the rotatable blade assembly has been moved to its final retracted position. More particularly, the rotatable blade assembly is formed with a blind bore at its outer end receiving the inner end of the stem and removably attached thereto. This removable attachment is effected by a plurality of axially-extending fingers at the inner end of the hollow stem having tips receivable within an annular recess formed in the blind bore in the rotatable blade assembly.

According to still further features in the described preferred embodiment, the stem is hollow, and the axially-extending fingers of the hollow stem are elastic such that the key within the hollow stem prevents radial displacement of the fingers to lock their tips within the annular recess of the rotatable blade assembly to thereby secure the hollow stem to the rotatable blade assembly. Upon removal of the key, the fingers are radially displaceable, to thereby permit removal of the hollow stem from the rotatable blade assembly.

As will be described more fully below, such a construction, together with additional features to be described, not only produces an effective seal at the time, and upon completion, of the cutting, but also enables the tapping fitting to be constructed in a compact form, and, further, to provide a clear indication when the cutting operation has been completed.

Further features and advantages of the invention will be apparent from the description below.

BRIEF DESCRIPTION OF THE DRAWINGS

The invention is herein described, by way of example only, with reference to the accompanying drawings, wherein:

FIG. 2 is a longitudinal sectional view of the fitting of FIG. 1;

FIG. 3 is a transverse sectional view along line III—III of FIG. 2;

FIGS. 4 and 5 are enlarged fragmentary views of portions of FIG. 2 to better show details;

DESCRIPTION OF A PREFERRED EMBODIMENT

Figure 1:
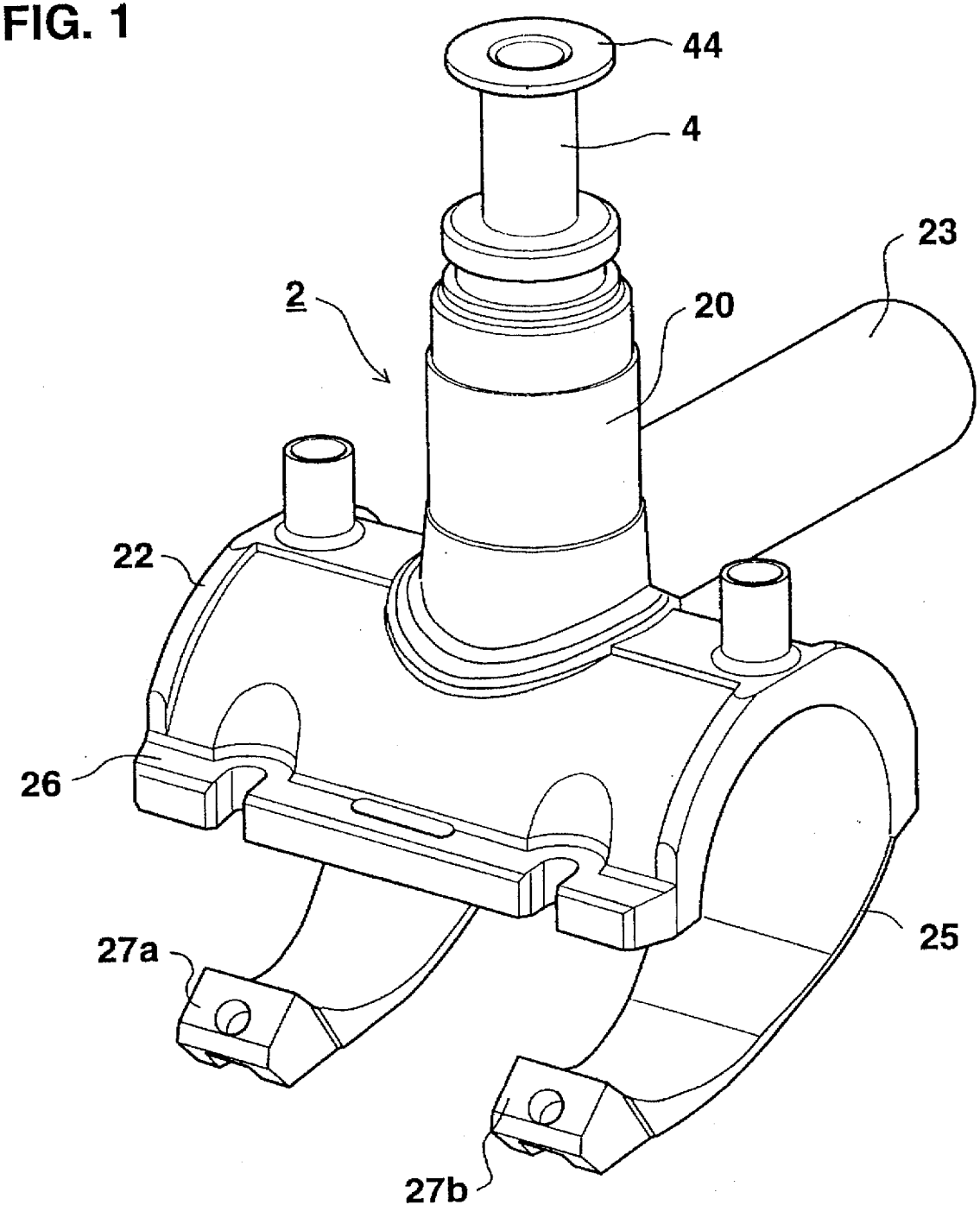
FIG. 1 is a three-dimensional view illustrating one form of tapping fitting constructed in accordance with the present invention.

The fitting illustrated in the drawings is a tapping tee fitting for application to a pipe P (FIG. 2) in order to tap a fluid, such as a high-pressure liquid or gas, to an ancillary device, such as a branch conduit or an outlet tap (not shown). The fitting includes a housing, generally designated 2, and a rotatable blade assembly 3 (FIG. 2) located within the housing for cutting a cylindrical slug from the pipe P in order to effect communication between the pipe and the ancillary device. The illustrated tapping fitting further includes a hollow stem 4 which is coupled to the rotatable blade assembly 3. Thus, when a key or wrench, schematically shown at 5, is inserted within the hollow stem and rotated, the key rotates the stem and thereby the blade assembly to cut the cylindrical slug from the plastic pipe P. The blade assembly 3 is then rotated in the opposite direction to retract the cut slug into the housing. The key and the hollow stem 4 are then removed.

As will be described more particularly below, the hollow stem effects a seal during both the time the slug is being cut and the time it is being retracted into the housing. The rotary blade assembly, when in its fully retracted position, thereafter effects the seal within the housing so that the hollow stem may then be removed.

In the example illustrated in the drawings, the pipe P is a plastic pipe, and the housing 2 is attached to it by electrofusion. Accordingly, the housing 2 is also made of a plastic material and includes heater wires 6 which may be electrically energized to bond the tapping fitting to the plastic pipe P by electrofusion. After the key and hollow stem are removed, a cap 7 (FIG. 6) is applied to produce a neat external appearance to the fitting.

Housing 2 includes a main section 20 formed with an axially-extending bore 21 therethrough in which are located the rotatable blade assembly 3 and the hollow stem 4. Housing 2 further includes an attaching section 22 in axial alignment with the housing main section 20 and its bore 21 for attaching the fitting to the plastic pipe P. Attaching section 22 is in the form of a saddle conforming to the curvature of the plastic pipe. It includes the heater wires 6 which are electrically energized in order to bond the fitting to the plastic pipe by electrofusion.

Housing 2 is further integrally formed with an outlet section 23 for directing the fluid from the plastic pipe to an ancillary device (not shown), such as a branch conduit, outlet tap, or the like. Outlet section 23 is formed with a bore 24 extending perpendicularly to and communicating with axial bore 21 of the housing main section 20.

Saddle section 22 is formed with a flexible strip 25 defining an integral hinge to enclose the plastic pipe P by means of jaws 26, 27a, 27b, receiving bolts 28 (FIG. 2) for clamping the saddle to the plastic pipe P before electrofused thereto.

The rotatable blade assembly 3 includes a head 30 at its outer end formed with external threads 31, and a cylindrical cutting blade 32 at its inner end. The cylindrical cutting blade 32 is of smaller outer diameter than that of the head 30, thereby defining an annular shoulder 33. The engagement of shoulder 33 with the outer surface of the plastic pipe defines the projected position of the cylindrical blade 32, thereby providing a clear indication when the cutting operation has been completed. The final retracted position of the blade assembly is defined by the engagement of the outer face 34 of its head 30 with a shoulder 20a formed in the inner face of the housing main section 20 around the upper end of its bore 21.

Head 30 of blade assembly 3 is formed with a blind bore 35 coaxial with bore 21 in the housing main section 20. As shown particularly in FIG. 5, the outer end of blind bore 35 is slightly enlarged in diameter to define an annular recess 36, and similarly the inner end of the blind bore is slightly enlarged to define another annular recess 37.

Hollow stem 4 is received within blind bore 35 of the blade assembly head 30. For this purpose, the inner end of the hollow stem 4 is formed with a plurality of axially-extending fingers 41 having an outer surface normally engaging the inner surface of the blind bore 35. As shown particularly in FIG. 5, a mid-portion of each of the fingers 41 is slightly reduced in thickness, such that the juncture 42 of the fingers with the remainder of the hollow stem 4 is received within recess 36 of the blind bore 35, and the tips 43 of the fingers are received within recess 37 of the blind bore.

The fingers 41 are very elastic in the radial direction, thereby permitting them to be easily received within, or removed from, the blind bore 35; however, when the key 5 is present within the hollow stem 4, the key prevents radial deformation or flexing of the fingers 41, and thereby prevents removal of the hollow stem from the blind bore.

The outer end of the hollow stem 4 is formed with an annular flange 44. This flange is engageable with the outer surface 20b of the main housing section 20 when the cutter assembly has reached its fully projected position after it has completed its cutting operation.

The juncture section 42 of the fingers 41 with the remainder of the hollow stem 4 is formed with an annular groove 45 receiving an O-ring 46, for sealing the hollow stem with respect to the cutter assembly 3. The hollow stem 4 is sealed with respect to the housing main section 20 by another O-ring 50 (FIG. 4) received within an annular groove 51 formed on the inner surface of the housing main section 20.

FIG. 4 illustrates an additional sealing arrangement between the hollow stem and the housing main section 20, namely the provision of a lip 52 formed on the inner surface of the housing main section around its shoulder 20a and engageable with the outer surface of the hollow stem 4. Such a seal may be used in addition to, or in lieu of, seal 46.

The main housing section 20 is further formed with external threads 53 for receiving cap 7 (FIG. 6) after the connection has been completed from the pipe P to the ancillary device via the illustrated fitting. The outer surface of the housing main section 20 is further formed with an annular recess 54 for receiving an O-ring 55 to effect a seal with cap 7.

The fitting illustrated in the drawings is used in the following manner for producing a tap between the plastic pipe P and an ancillary device, such as a branch pipe or outlet tap (not shown).

The fitting is first attached to the pipe P by applying its saddle section 22 around the pipe and tightening the bolts 28 through the jaws 26, 27a, 27b. Electrical current is then applied to the heater wires 6 to electrofuse the saddle to the pipe. The ancillary device (e.g., branch pipe or outlet tap) is then connected to the outlet section 23 of the fitting.

Hollow stem 4 is inserted into the blind bore 35 of the blade assembly head 30 (if not previously inserted). Key 5 is then inserted into the hollow stem and is rotated to rotate the blade assembly 3, whereby its external threads 31 cause the blade assembly 3 to move axially from its initial retracted position illustrated in FIG. 2 to a projected position towards the plastic pipe P. As the blade assembly 3 is thus rotated, it moves axially causing its cylindrical cutting blade 32 to cut a cylindrical slug from the plastic pipe P, until the annular shoulder 33 of the blade assembly limits against the outer surface of the plastic pipe.

This is the fully projected position of the plastic pipe reached when the cutting operation has been completed. This position is clearly indicated by the additional resistance to the rotation of key 5 produced when annular shoulder 33 engages the outer surface of the plastic pipe. It is also indicated by the engagement of the annular flange 44 of the hollow stem with the outer surface 20b of the housing main section 20. A visual indication of the additional movement required of the blade assembly 30 to reach its fully projected position is thus provided by the distance of flange 44 from the outer surface 20b of the housing main section 20.

Figure 6:
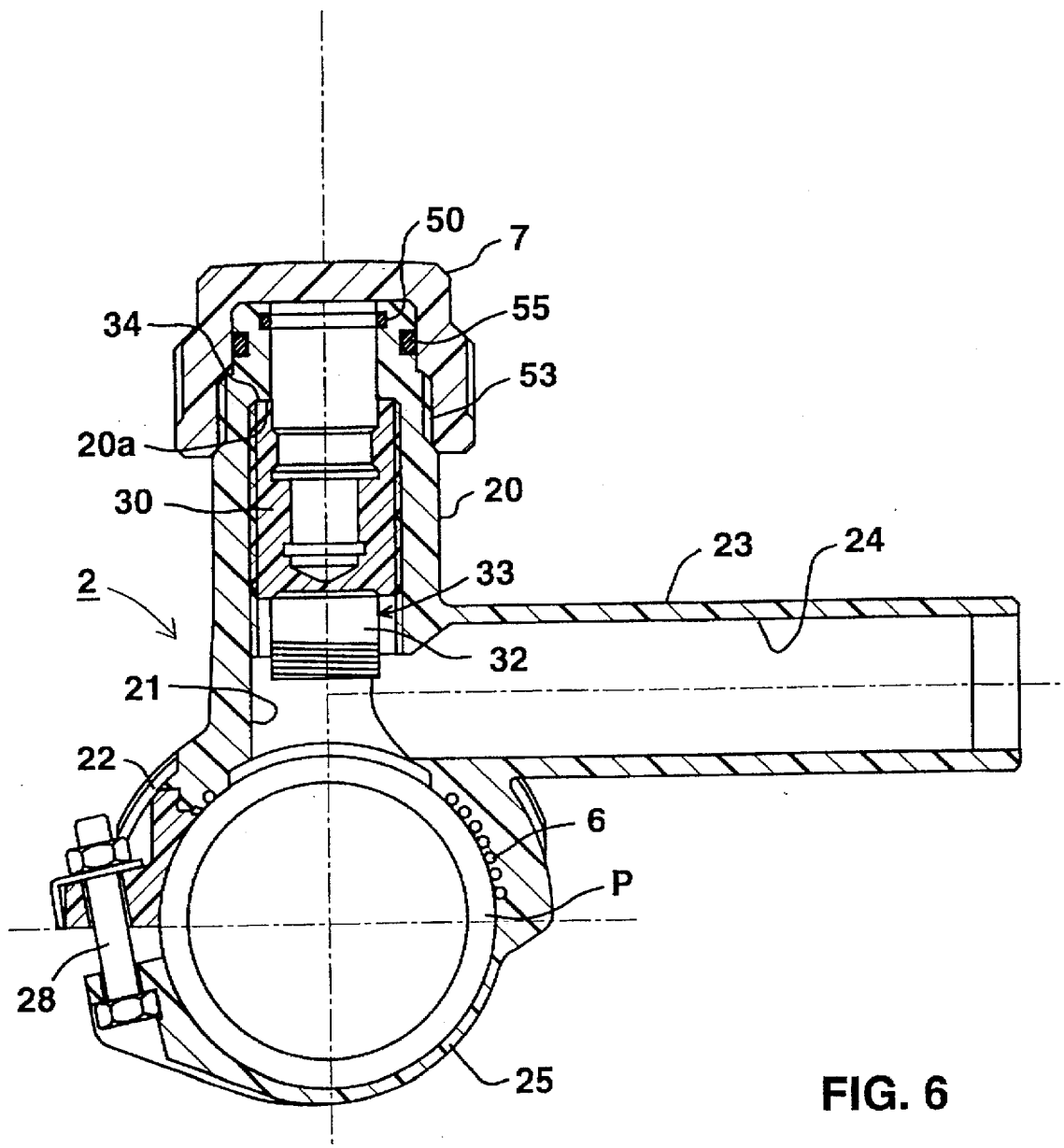
FIG. 6 is a view similar to that of FIG. 2 but showing the final condition of the tapping fitting after the hollow stem used for rotating the cutter assembly has been removed and a cap applied to cover the bore which had received the stem.

After the blade assembly 3 has thus been moved to its fully projected position cutting a cylindrical slug from the pipe, the cutter assembly is then rotated in the opposite direction by key 5 within hollow stem 4, to retract the cutter assembly. Its fully retracted position is reached when its annular surface 34 engages the shoulder 20a of the housing main section 20, as shown in FIG. 6. Key 5 is then removed from the hollow stem 4, enabling the hollow stem 4 to be easily detached. This may be done by a simple pull-out force since the fingers 41, no longer backed up by the key, will easily flex to unseat their tips 43 from recess 37 in the blind bore 35 of the cutter assembly head 30.

After both the key 5 and the hollow stem 4 have been removed, cap 7 may be applied via threads 53 to cover the axial bore 21 in the housing main section 20, and the cutter assembly 3 retained in that section.

It will be seen that the hollow stem 4, which is used with the key 5 for rotating the cutter assembly 3, produces an effective seal both during the cutting operation, and during the movement of the cut slug to its fully retracted position within the housing. Thus, O-ring 46 (FIG. 5) produces an effective seal between the hollow stem 4 and the cutter assembly 3; whereas O-ring 50 (FIG. 4), and/or lip 52, produces an effective seal between the hollow stem and the housing main section 20. After the slug has been cut and moved to its fully retracted position with the cutter assembly 3, annular surface 34 of the cutter assembly engaging surface 20a of the housing effects the seal with the housing.

It will also be seen that the completion of the cutting operation is clearly indicated by the engagement of annular surface 33 of the cutter assembly 3 with the pipe P. Such an indication is also provided by annular flange 44 when it engages the outer surface 20b of the housing main section 20 at the completion of the cutting operation. The distance between flange 44 and the outer surface of the housing main section 20 also provides a visual indication of the additional amount of rotation needed in order to complete the cutting operation. The engagement of surface 34 of the cutter assembly 3 with the inner surface 20a of the housing main section 20 provides a clear indication when the cutter assembly has been moved to its final retracted position.

It will also be seen that the flexible fingers 41 formed at the end of the hollow stem 4 provide a means for easily attaching and removing the stem with respect to the cutter assembly 3. Thus, whenever the key 5 is received within the hollow stem, the key backs-up the fingers 41 preventing their flexing; and whenever the key is not present within the hollow stem 4, the fingers 41 are sufficiently flexible to permit them to be easily applied to or removed from the blind bore 35 of the cutter assembly head 35. The hollow stem 4 may therefore be constructed of relatively inexpensive material and disposed after one-time use.

While the invention has been described with respect to one preferred embodiment, it will be appreciated that many variations may be made. For example, the hollow stem 4 may be attached to the cutter assembly 3 by other means, such as by threading it into the cutter assembly. It could also be integrally formed with the cutter assembly and severed therefrom after the cutter assembly has completed its cutting operation and has been retracted into its final retracted position within the housing. Further, the stem could be solid, rather than hollow, and rotated by a key or wrench engaging the external surface of the stem. The illustrated fitting could also be used to effect a mechanical coupling rather than an electrofusion coupling to the fluid-carrying pipe.

Many other variations, modifications and applications of the invention will be apparent.

We claim:

1. A tapping fitting for application to a pipe in order to tap a fluid conducted therethrough to an ancillary device, comprising:

a housing including a main section, an attaching section in axial alignment with the housing main section for attaching the fitting to a pipe, and an outlet section for directing the fluid from the pipe to the ancillary device;

a rotatable blade assembly formed at one end, constituting its outer end, with external threads threadedly received within said housing main section and including a cylindrical cutting blade at its opposite, inner end such that a key may be used to rotate the blade assembly and to move it axially from an initial retracted position within the housing main section, to a projected position through said housing attaching section to cut a cylindrical slug from the pipe when attached thereto, and then to a final retracted position within the housing main section to thereby effect a fluid connection between the pipe and the ancillary device;

a stem having an inner end secured to the rotatable blade assembly, and an outer end for receiving said key to rotate the stem and the blade assembly from its initial retracted position to its projected position and then to its final retracted position;

and a seal between the outer surface of the stem and the housing main section effective to seal the interior of the pipe from the external side of the housing both during and after the cutting of said cylindrical slug from the pipe;

said stem, in the initial retracted position of the rotatable blade assembly, projecting outwardly of said housing main section and including an annular flange engageable with the outer surface of the housing main section to define said projected position of the rotatable blade assembly.

2. The fitting according to claim 1, wherein said rotatable blade assembly is formed with a blind bore at its outer end receiving the inner end of the stem which is removably attached thereto.

3. The fitting according to claim 2, wherein said stem includes an outer, annular sealing ring engageable with the inner surface of said blind bore in the rotatable blade assembly.

4. The fitting according to claim 2, wherein said inner end of the stem is removably attached to said rotatable blade assembly by a plurality of axially-extending fingers at said inner end of the stem having tips receivable within an annular recess formed in said blind bore in the rotatable blade assembly.

5. The fitting according to claim 4, wherein said stem is hollow, and said axially-extending fingers of the hollow stem are elastic such that the key, when within the hollow stem, prevents radial displacement of the fingers to lock their tips within said annular recess of the rotatable blade assembly to thereby secure the stem to the rotatable blade assembly, but when the key is removed from said hollow stem, said fingers are radially displaceable to thereby permit removal of-the stem from the rotatable blade assembly.

6. The fitting according to claim 1, wherein said seal between the outer surface of the stem and the housing main section includes an annular sealing ring received within an annular groove in the inner surface of the housing main section.

7. The fitting according to claim 1, wherein said seal between the outer surface of the stem and the housing main section includes an annular lip integrally formed in the inner surface of the housing main section.

8. The fitting according to claim 1, wherein said rotatable blade assembly includes an annular shoulder at its inner end engageable with the outer surface of the attached pipe to define said projected position of the rotatable blade assembly.

9. The fitting according to claim 8, wherein the outer end of said rotatable blade assembly is engageable with the inner surface of the housing main section to define said final retracted position of the rotatable blade assembly.

10. The fitting according to claim 1, further including a cap applied over the outer end of said housing main section after the rotatable blade assembly has been moved to its final retracted position, and the stem and key have been removed from the fitting.

11. The fitting according to claim 1, wherein said pipe is a plastic pipe, and said housing attaching section includes heater wires for bonding said housing attaching section to the plastic pipe by electrofusion.

12. The fitting according to claim 1, wherein said housing attaching section is in the form of a saddle conforming to the curvature of the pipe to which it is attached.

13. The fitting according to claim 12, wherein said saddle is of plastic and is integrally formed with a pair of curved jaws enclosing the plastic pipe, said jaws being interconnected at one side by an integral hinge, and being connectible together at the opposite side by a fastener.

14. A tapping fitting for application to a pipe in order to tap a fluid conducted therethrough to an ancillary device, comprising:

a housing including a main section, an attaching section in axial alignment with the housing main section for attaching the fitting to a pipe, and an outlet section for directing the fluid from the pipe to the ancillary device;

a rotatable blade assembly formed at one end, constituting its outer end, with external threads threadedly received within said housing main section and including a cylindrical cutting blade at its opposite, inner end such that a key may be used to rotate the blade assembly and to move it axially from an initial retracted position within the housing main section, to a projected position through said housing attaching section to cut a cylindrical slug from the pipe when attached thereto, and then to a final retracted position within the housing main section to thereby effect a fluid connection between the pipe and the ancillary device;

a stem having an inner end secured to the rotatable blade assembly, and an outer end for receiving said key to rotate the stem and the blade assembly from its initial retracted position to its projected position and then to its final retracted position;

and a seal between the outer surface of the stem and the housing main section effective to seal the interior of the pipe from the external side of the housing both during and after the cutting of said cylindrical slug from the pipe;

said rotatable blade assembly including an annular shoulder at its inner end engageable with the outer surface of the attached pipe to define said projected position of the rotatable blade assembly.

15. The fitting according to claim 14, wherein the outer end of said rotatable blade assembly is engageable with the inner surface of the housing main section to define said final retracted position of the rotatable blade assembly.

16. The fitting according to claim 14, wherein said stem includes an outer, annular sealing ring engageable with the inner surface of said blind bore in the rotatable blade assembly.

17. A tapping fitting for application to a pipe in order to tap a fluid conducted therethrough to an ancillary device, comprising:

a housing including a main section, an attaching section in axial alignment with the housing main section for attaching the fitting to a pipe, and an outlet section for directing the fluid from the pipe to the ancillary device;

a rotatable blade assembly formed at one end, constituting its outer end, with external threads threadedly received within said housing main section and including a cylindrical cutting blade at its opposite, inner end such that a key may be used to rotate the blade assembly and to move it axially from an initial retracted position within the housing main section, to a projected position through said housing attaching section to cut a cylindrical slug from the pipe when attached thereto, and then to a final retracted position within the housing main section to thereby effect a fluid connection between the pipe and the ancillary device;

a stem having an inner end secured to the rotatable blade assembly, and an outer end for receiving said key to rotate the stem and the blade assembly from its initial retracted position to its projected position and then to its final retracted position;

and a seal between the outer surface of the stem and the housing main section effective to seal the interior of the pipe from the external side of the housing both during and after the cutting of said cylindrical slug from the pipe;

said rotatable blade assembly being formed with a blind bore at its outer end receiving the inner end of the stem which is removably attached thereto;

said end of the stem being removably attached to said rotatable blade assembly by a plurality of axially-extending fingers at said inner end of the stem having tips receivable within an annular recess formed in said blind bore in the rotatable blade assembly;

said stem being hollow, and said axially-extending fingers of the hollow stem being elastic such that the key, when within the hollow stem, prevents radial displacement of the fingers to lock their tips within said annular recess of the rotatable blade assembly to thereby secure the stem to the rotatable blade assembly, but when the key is removed from said hollow stem, said fingers are radially displaceable to thereby permit removal of the stem from the rotatable blade assembly.

18. The fitting according to claim 17, wherein said stem, in the initial retracted position of the rotatable blade assembly, projects outwardly of said housing main section and includes an annular flange engageable with the outer surface of the housing main section to define said projected position of the rotatable blade assembly.

19. The fitting according to claim 17, wherein said rotatable blade assembly includes an annular shoulder at its inner end engageable with the outer surface of the attached pipe to define said projected position of the rotatable blade assembly.

20. The fitting according to claim 17, wherein said stem includes an outer, annular sealing ring engageable with the inner surface of said blind bore in the rotatable blade assembly.

* * * * *